US008842816B2

(12) United States Patent
Lian et al.

(10) Patent No.: US 8,842,816 B2
(45) Date of Patent: Sep. 23, 2014

(54) IMPLEMENTATION OF THE INTELLIGENT NETWORK IN THE NEXT GENERATION NETWORKS AND ITS INTERCONNECTION TO THE PSTN (75) Inventors: Weiliang Lian, Shenzhen (CN); Aijun Li, Shenzhen (CN); Yimin Xi, Shenzhen (CN); Lei Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 2684 days.

(21) Appl. No.: 10/537,043

(22) PCT Filed: Dec. 3, 2002

(86) PCT No.: PCT/CN02/00866
§ 371 (c)(1),
(2), (4) Date: Jan. 17, 2006

(87) PCT Pub. No.: WO2004/051945
PCT Pub. Date: Jun. 17, 2004

(65) Prior Publication Data
US 2006/0146786 A1 Jul. 6, 2006

(51) Int. Cl.
H04M 7/00 (2006.01)
H04Q 3/00 (2006.01)
H04L 12/66 (2006.01)
(52) U.S. Cl.
CPC ........... *H04Q 3/0045* (2013.01); *H04Q 3/0029* (2013.01); *H04L 12/66* (2013.01)
USPC ..................................... 379/221.08; 370/352
(58) Field of Classification Search
CPC . H04M 7/006; H04M 7/1245; H04M 7/1255; H04M 15/55

USPC .............. 379/219, 91.02, 93.09, 164, 179, 379/221.08–221.12, 224, 252, 373.01, 379/373.02, 373, 373.03, 373.04, 374.01, 379/374.02, 374.03; 370/352–356, 360, 370/367, 401, 389, 387, 388
See application file for complete search history.

(56) References Cited

U.S. PATENT DOCUMENTS 5,479,495 A 12/1995 Blumhardt
5,553,130 A 9/1996 Turner
(Continued)

FOREIGN PATENT DOCUMENTS

EP 0928120 A2 7/1999

OTHER PUBLICATIONS

Finkelstein et al (The Future of the Intelligent Network), Jun. 200, pp. 100-106.*

(Continued)

*Primary Examiner* — Akelaw Teshale
(74) *Attorney, Agent, or Firm* — Michael Best & Friedrich LLP (57) ABSTRACT The present invention discloses a Softswitch and system for implementing the intelligent network in the next generation networks and a method for interconnecting the intelligent networks to the PSTN. The Softswitch comprises: a network adaptive device for implementing the communication between the Softswitch and other devices in said network, as well as receiving the call request; a call server for determining whether the call received by said network adaptive device is a common call or the call of the intelligent network and processing the common call; and an INAP adapter for responding the call of the intelligent network and encoding/decoding the INAP message.

18 Claims, 5 Drawing Sheets (56) References Cited

U.S. PATENT DOCUMENTS

| | | | | |
|---|---|---|---|---|
| 6,003,031 | A | * | 12/1999 | Hartikainen et al. ................. 1/1 |
| 6,363,424 | B1 | * | 3/2002 | Douglas et al. ............... 709/224 |
| 6,614,781 | B1 | * | 9/2003 | Elliott et al. .................. 370/352 |
| 6,622,016 | B1 | * | 9/2003 | Sladek et al. .............. 455/414.1 |
| 6,826,198 | B2 | * | 11/2004 | Turina et al. .................. 370/467 |
| 6,950,441 | B1 | * | 9/2005 | Kaczmarczyk et al. ...... 370/467 |
| 6,968,051 | B1 | * | 11/2005 | Wood ........................ 379/201.01 |
| 7,103,644 | B1 | * | 9/2006 | Zhang et al. ................. 709/219 |
| 2001/0010690 | A1 | | 8/2001 | Shen |
| 2004/0022237 | A1 | * | 2/2004 | Elliott et al. .................. 370/356 |

OTHER PUBLICATIONS

IEEE Communications Magazine, Tsun-Chieh Chiang et. al., IN Services for Converged (Internet) Telephony, Jun. 2000, pp. 108-115.
European Patent Office Summons to attend oral proceedings pursuant to Rule 115(1) EPC, dated Feb. 17, 2009, EP patent application No. 02782657.7-2416 / 1569398, 7 pages.

* cited by examiner

IMPLEMENTATION OF THE INTELLIGENT NETWORK IN THE NEXT GENERATION NETWORKS AND ITS INTERCONNECTION TO THE PSTN

TECHNICAL FIELD

The present invention relates to intelligent network (IN), in particular, to the implementation of an intelligent network in the next generation networks (NGN) and its interconnection to the traditional PSTN (Public Switched Telephone Network)

TECHNICAL BACKGROUND

Due to overlaying intelligent networks over common-used circuit switching networks, not only can we make common calls, but also we can get other intelligent services through dialing different Service Access Codes. At present, widely-used intelligent network services include Freephone, Account card calling (ACC), Virtual private network (VPN), Universal Personal Telecommunication (UPT), Wide Area Centrex (WAC), Televoting (VOT) and Mass Calling (MAS) Service and so on.

U.S. Pat. No. 5,479,495 (Method and system for automatically accessing and invoking switch-based services in an advanced intelligent network) and U.S. Pat. No. 5,553,130 (Number translation services matrix) disclose the ways for implementing PSTN-based services of providing SCP, their contents are incorporated herein by reference.

In the next generation communication networks, there will be much more intelligent service providers providing services, so it is necessary to continue such intelligent network services in the next generation networks. On the other hand, traditional intelligent network services can not be replaced at one night, as a result, the following requirements arise: the users of the traditional PSTN network want to access intelligent networks in the next generation networks and the users in the next generation networks want to access the intelligent services in the traditional PSTN networks. In other words, there is a need of interconnection of intelligent network services between PSTN networks and the next generation networks.

However, because of the essential differences in structures, principles and standards between traditional PSTN networks and the next generation networks, it is very difficult to realize the requirements mentioned above.

SUMMARY OF THE INVENTION

According to one aspect of the present invention, there is provided a Softswitch for a next generation network, characterized in that said Softswitch includes: a network adaptive device for implementing the communication between the Softswitch and other devices in said network, as well as receiving the call request; a call server for determining whether the call received by said network adaptive device is a common call or a call of the intelligent network and processing the common call; and an INAP adapter for responding the call of the intelligent network and encoding/decoding the INAP message.

According to another aspect of the present invention, there is provided a system for implementing an intelligent network, including: a Softswitch, said system further includes at least one SCP for executing intelligent service logics and producing INAP messages; and an IP network for connecting said Softswitch and the SCP; herein, said Softswitch includes: a network adaptive device for implementing the communication between the Softswitch and other devices in said network, as well as receiving the call request; a call server for determining whether the call received by said network adaptive device is a common call or a call of the intelligent network and processing the common call; and an INAP adapter for responding the call of the intelligent network and encoding/decoding the INAP message.

According to still another aspect of the present invention, there is provided a method for a PSTN telephone to access into an intelligent network service in a next generation network, herein there is at least one SCP in said next generation network for executing the intelligent service logics, said method includes: issuing a call request from said PSTN telephone through dialing an accessing code; transforming said call request issued by the PSTN telephone into a protocol format suitable for the next generation network; determining whether said call request is an intelligent network service provided by the SCP or not; encoding said call request into an INAP message and transferring the message to said SCP, if said call request is an intelligent network service provided by the SCP; and responding said INAP message and processing said call request by said SCP.

According to still another aspect of the present invention, there is provided a method for a telephone in a next generation network to access into an intelligent network service in a PSTN network, herein there is at least one SCP in said PSTN network for executing the intelligent service logics, said method includes: issuing a call request from said telephone in the next generation network through dialing an accessing code; determining whether said call request is an intelligent network service provided by the SCP or not; encoding said call request into an INAP message, if said call request is an intelligent network service provided by the SCP; transforming said INAP message into a format suitable for the PSTN network and transferring said INAP message to said SCP; and responding said INAP message and processing said call request by said SCP.

According to still another aspect of the present invention, there is provided a method for a telephone in a next generation network to access into an intelligent network service in a PSTN network, herein there is at least one SCP in said PSTN network for executing the intelligent service logics, said method includes: issuing a call request from said telephone in the next generation network through dialing an accessing code; transforming said call request into a format suitable for the PSTN network and transferring it to the PSTN network; determining whether said call request is an intelligent network service provided by the SCP or not; encoding said call request into an INAP message, if said call request is an intelligent network service provided by the SCP; transferring said INAP message to said SCP; and responding said INAP message and processing said call request by said SCP.

BRIEF DESCRIPTION OF THE DRAWINGS

It is believed that the above and other advantages, objectives and features of the invention will become more apparent through the following description of the preferred embodiments of the present invention with reference to the drawings, in which.

DETAILED DESCRIPTION OF THE INVENTION

Next, detailed description will be given to the preferred embodiments of the present invention with reference to the drawings.

Figure 1:
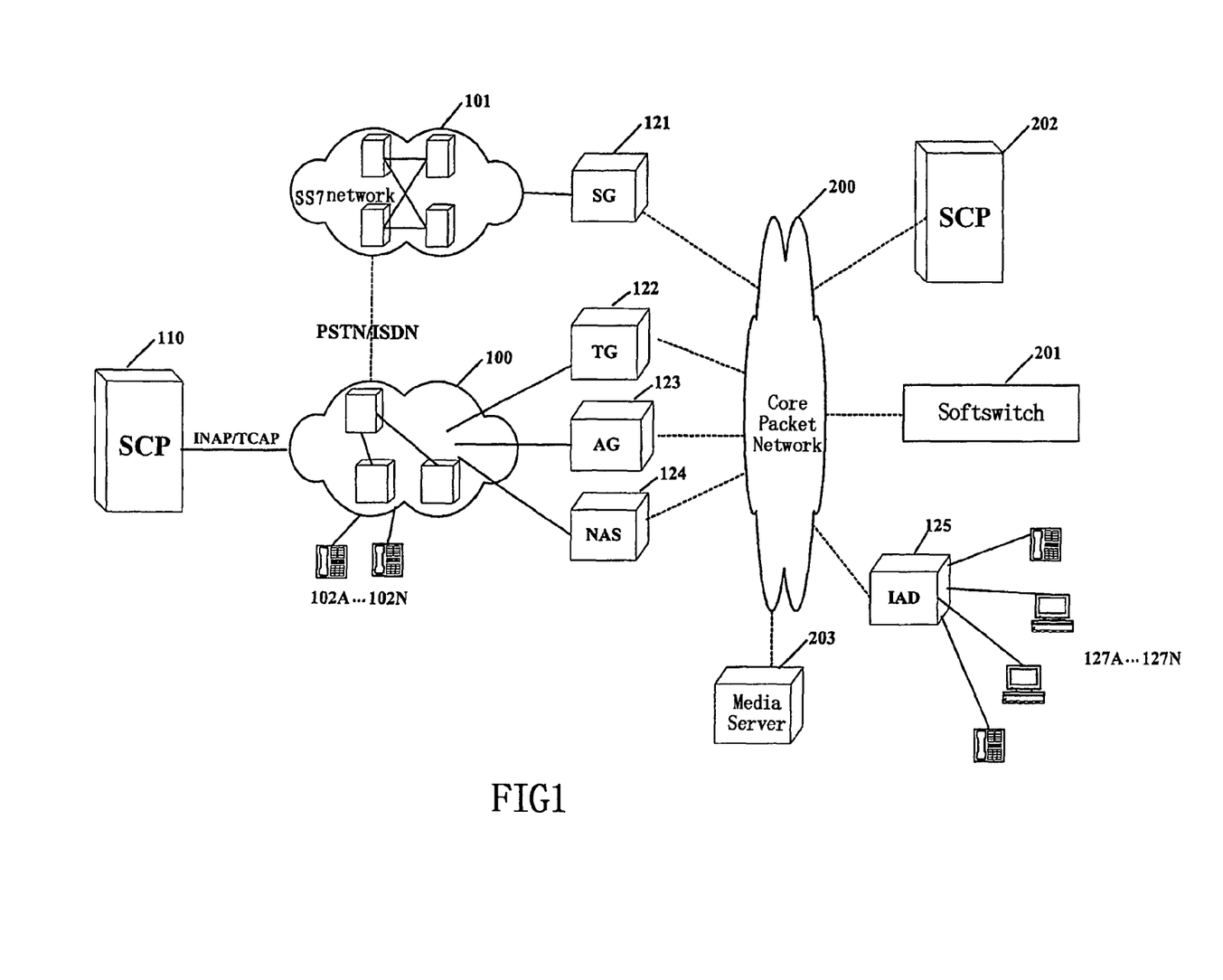
FIG. 1 is a diagram illustrating the implementation of interconnection of intelligent network services in PSTN and the next generation networks according to an embodiment of the present invention.

FIG. 1 is a diagram illustrating the implementation of interconnection of intelligent network services in PSTN and the next generation networks according to an embodiment of the present invention. FIG. 1 shows PSTN/ISDN 100 and SS7 (Signaling System Number 7) network 101. Those skilled in the art know that signalings are transmitted through public channel signaling protocol, i.e. SS7, in a data network independent of the audio/medium stream circuit network. In the present application, a network that includes a SS7 network and a PSTN/ISDN circuit switching network all together will be called a PSTN network.

A traditional intelligent network is an architecture that realizes advanced intelligent functions. Existing ways for implementing an intelligent network usually include service switching point (SSP), such as central exchange or end office; service control point (SCP), for executing functional service logics, being the core of a intelligent network; intelligent peripheral (Ip), for providing special resources required by intelligent network services, such as prompting play operation, storing records, facsimiles or others; and other components, such as, service data point (SDP), service management point (SMP), service creation environment point (SCEP), attached device (AD) and so on.

As shown in FIG. 1, intelligent network services are realized in the PSTN network, wherein at least one SCP 110 is included. Of course, in a real application environment, more SCPs and other components mentioned above may be included. For simplicity, here one SPC 110 is taken as an example.

Besides, FIG. 1 shows the core packet switched network 200 (next generation network, NGN), NGN network refers to a combined network with IP as the central service, which may also support audio, data and multimedia services. Because a PSTN network is based on circuit switching and a NGN network is based on IP packet switching, it is necessary to arrange all kinds of gateways between them so as to connect these two networks to realize interconnection of telephone service. These gateways mainly include two types: media gateway and signaling gateway. A media gateway is used for transferring media information (such as audio and video) from one network side to another network side, the transfer gateway TG 122 and access gateway AG 123 in FIG. 1 are examples of media gateways. A signaling gateway is used for transferring signaling information from one network side to another network side. Signaling gateway SG 121 in FIG. 1 is an example of signaling gateways. In actual applications, there are gateways that combine functions of the signaling gateway and the media gateway, such as the network accessing server NAS 124. Typically, NAS 124 may use SIP or H.323 to implement interconnection of telephone services on the PSTN network and the NGN network.

In FIG. 1, there is Softswitch 201 and service control point SCP 202 connecting to the core packet switched network 200. The Softswitch equipment, which is the core of the next generation network for calling and control, is used for providing call control and connection control functions to the services that have real time requirements in the next generation network. Based on the research on the existing Softswitch equipments, the present invention is to further implement intelligent services in next generation networks and interconnection of intelligent services between PSTN networks and next generation networks.

Users of a next generation network may call telephone, intelligent network, video and other services through telephones and terminals 127A-127N. Usually, these telephones and terminals 127A-127N may be connected to the core packet switched network 200 through the comprehensive accessing device IAD 125.

Figure 2:
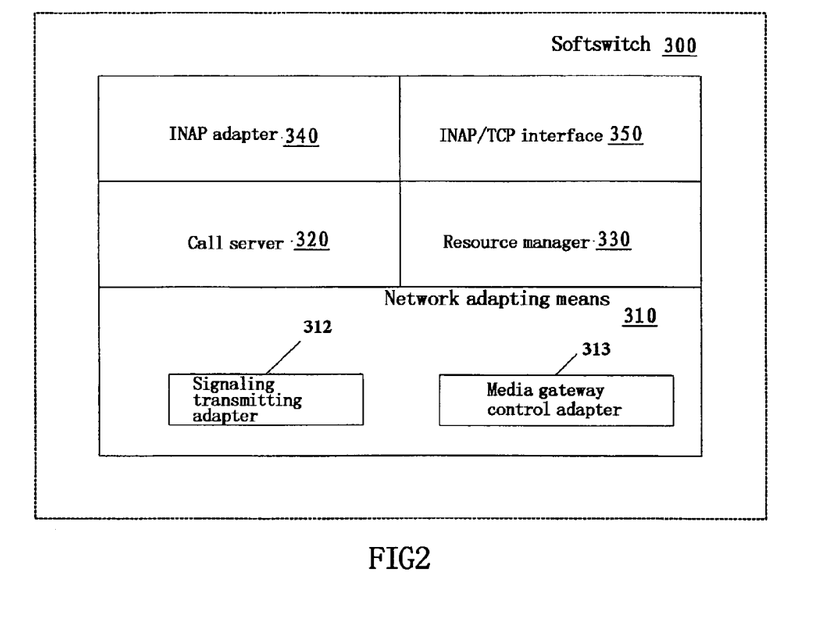
FIG. 2 is a block diagram showing the Softswitch software layered architecture according to an embodiment of the present invention.

According to one aspect of the present invention, there is provided an approach for implementing intelligent services in the next generation network. Next, detailed description will be given with reference to FIG. 1 and FIG. 2. FIG. 2 is a block diagram showing the Softswitch software layered architecture according to an embodiment of the present invention. As shown in FIG. 2, the Softswitch 300 includes: a network adaptive device 310, a call server 320, a resource manager 330, an INAP (CAP, MAP) adapter 340 and an INAP (CAP, MAP)/TCP interface 350.

The network adaptive device 310 is located at the bottom layer of the function modules of the Softswitch, for supporting standard protocols in said network, completing bottom layer communications between the Softswitch and other devices on the network, receiving data in packets from the network 200, including call requests from telephone users, and sending data from the modules of higher layers, with required format and address, to the network 200.

In the network adaptive device 310 of the Softswitch shown in FIG. 2, signaling transmitting adapter 312 and media gateway control adapter 313 are included. The signaling transmitting adapter is used for transferring signaling data through IP packets. For instance, according to SIGTRAN protocol or H.248 protocol, the signaling data are transferred to the signal gateway SG121 and received from the signaling gateway SG121. Those skilled in the art know that SIGTRAN protocol and H.248 protocol have been designed for transmitting signaling information in IP networks. However, it should be noted that the present invention is not limited to using SIGTRAN protocol or H.248 protocol. Other protocols that can achieve the above-mentioned objectives may be used either.

The media gateway control adapter 313 in the network adaptive equipment 310 is used for transmitting control information between the Softswitch and all kinds of media gateways in the network 200, such as, transmitting control information, according to H.248 protocol, to and from the transfer gateway TG 122 and access gateway AG 123, or transmitting control information, according to SIP or H.323 protocols, to and from the network accessing server NAS 124. The present invention is not limited to using H.248, H.323, SIP or MGCP protocols for transferring control information, other protocols that can achieve the above-mentioned objectives may be used either.

There are a call server 320 and a resource manager 330 in the higher layer of the network adaptive device 310. The call server 320 is used to process the basic call, to complete the identification of the intelligent service and upward transmission of the data of the intelligent service, and to make response to some requests downward transmitted from the INAP (CAP, MAP) adapter 340. The resource manager 330 is used to manage resources, managing resources, such as audio resources, and controlling related process. In the intelligent services, when SCP prompts a user to input interactive information, it is the resource manager 330 that controls the interaction between the user and the audio resource, and transmits the user input data to the INAP (CAP, MAP) adapter 340 at the higher layer.

The INAP (CAP, MAP) adapter 340 is used to interpret an INAP massage, transfer the control information contained in the message to the call server 320 and the resource manager 330, and encode the interaction information with the user into an INAP message and send the message to, such as, SCP 202 through a corresponding transmission protocol.

Optionally, in the present embodiment, the Softswitch may further include an INAP(CAP, MAP)/TCP interface 350 for directly sending an INAP message produced by the INAP adapter through TCP/IP protocol and correspondingly receiving an INAP message directly transmitted from the network 200 by using TCP/IP.

Figure 3:
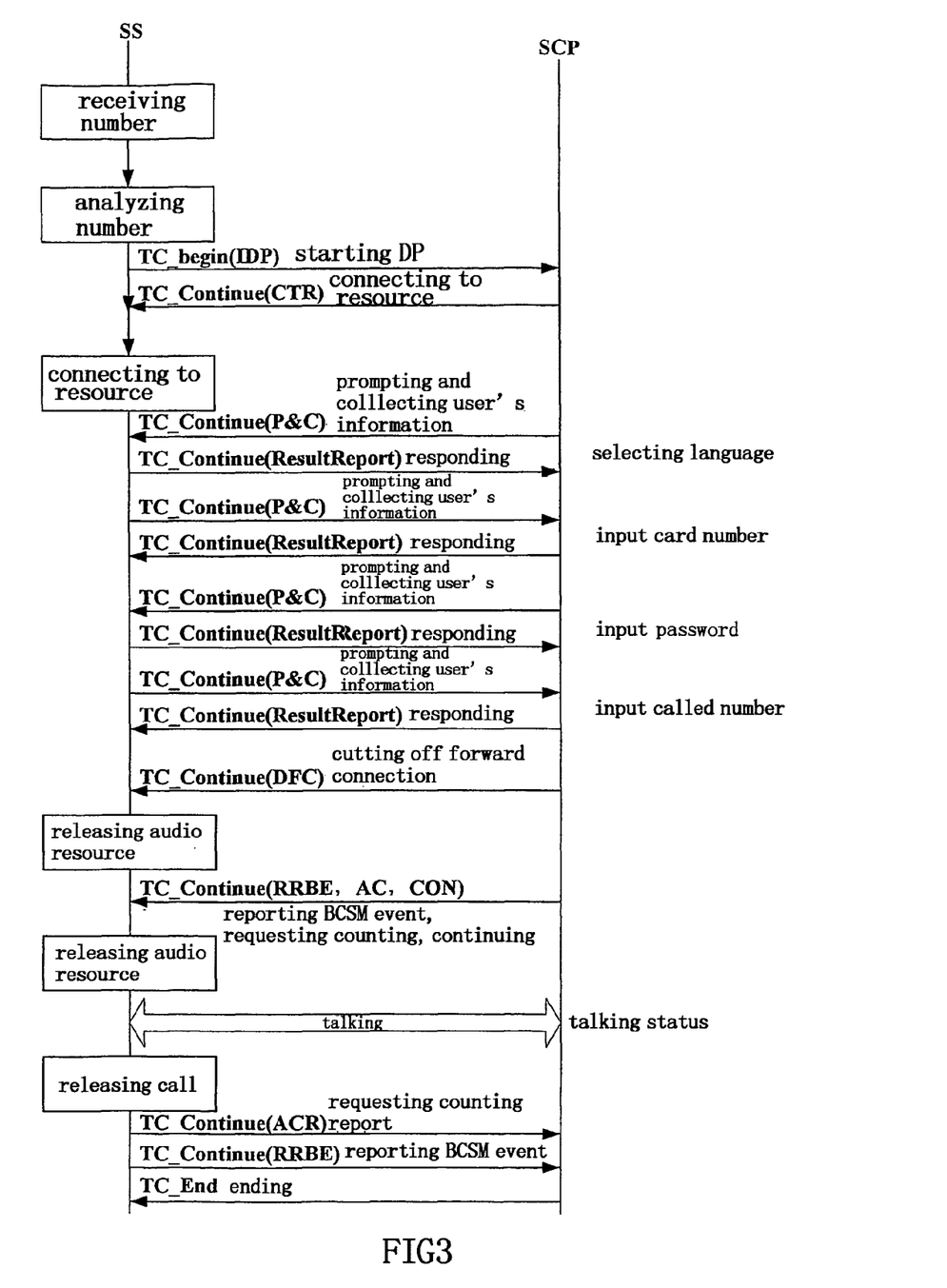
FIG. 3 is a diagram illustrating the process for implementing intelligent network service of Account card calling in a NGN network by using the Softswitch according to an embodiment of the present invention.

Thus, by using above-mentioned Softswitch as well as SCP 202, media server 203 and others, it is possible to implement intelligent services in a next generation network. Next, taking the intelligent network counting card as an example, the process to implement an intelligent service will be described in an embodiment of the present invention. FIG. 3 is a diagram illustrating the process for implementing intelligent network counting card service in the network 200 by using the Softswitch according to an embodiment of the present invention.

Suppose that a telephone 127A connected to network 200 through the IAD 125 has called an accessing code for the intelligent network Acounting Calling Card. First, the call is transmitted to the Softswitch 201. After the Softswitch 201 completes reception of the accessing code, the call server 320 analyzes the called number and determines whether the call is an intelligent call. The call server 320 may complete the determination through searching a database (not shown) that stores the accessing codes of all intelligent services. When the call is determined as an intelligent call, the call server 320 will transmit the call to the INAP adapter. Then, the INAP (CAP, MAP) adapter 340 will produce an IDP message and send it to the SCP 202 by the signaling transmission adapter through SIGTRAN protocol. Alternatively, the message may be transmitted to the SCP 202 through INAP (CAP, MAP)/TCP interface 340.

Having received the IDP message, the SCP 202 executes corresponding service logics, producing CTR (connecting-to-resource message) instruction message and sending it to the Softswitch 201. The Softswitch 201 receives the CTR instruction message and decodes the message with the INAP (CAP, MAP) adapter 340, then the resource manager 330 and the call server 320 work together to connect the user's media stream with the resource of the media server 203, and after having received the P&C instruction message from SCP 202, the resource manager 330 instructs the media server 203 to play prompt voice and collects the user-dialed number. The user-dialed number is encoded into a ResultReport response message by the INAP (CAP, MAP) adapter 340 and sent to the SCP 202. Thus, after several interactions, the SCP 202, through the Softswitch 201, has collected the user's card number, secret key, called number and other information.

Then, the SCP 202, based on the service logic flow, sends a connect instruction to the Softswitch 201, and after the INAP (CAP, MAP) adapter 340 of the Softswitch 201 has decoded the instruction message, the callee is connected. The call is established. When the caller or the callee hangs up, the INAP (CAP, MAP) adapter 340 of the Softswitch 201 produces a counting message, a BCSM event report and other messages, and sends them to the SCP 202, then the call is finished.

Figure 4:
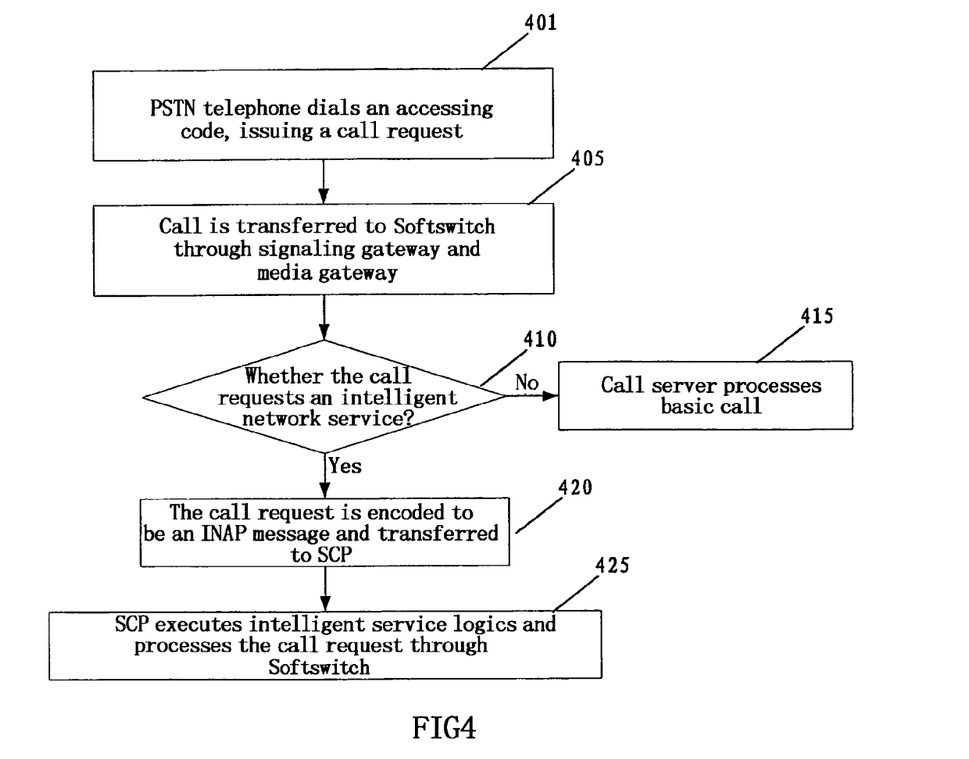
FIG. 4 is a flow chart showing a telephone in a PSTN network accessing intelligent services in a NGN network according to an embodiment of the present invention.

Besides, the present invention further provides a method for a PSTN telephone to access into an intelligent network service in a next generation network. FIG. 4 is a flow chart showing a telephone in a PSTN network accessing intelligent services in a NGN network according to an embodiment of the present invention.

As shown in FIG. 4, first at Step 401, a PSTN telephone, such as the telephone 102A, dials an accessing code and issues a call request. Then, at Step 405, through a signaling gateway (such as the SG 121 in FIG. 1) and a media gateway (such as the TG 122 in FIG. 1), the call is outbound for the Softswitch 201 of the core packet network 200. At Step 410, the Softswitch 201 analyzes the call, determines whether the call is a call for an intelligent network service; if not, the call server 320 of the Softswitch 201 process the basic call at Step 415, otherwise, at Step 420, the INAP (CAP, MAP) adapter 340 of the Softswitch 201 produces an INAP message and sends it to the SCP 202. Finally, at Step 425, the SCP 202 executes service logics and processes the call request through interaction of the Softswitch 201 with the telephone 102A.

Figure 5:
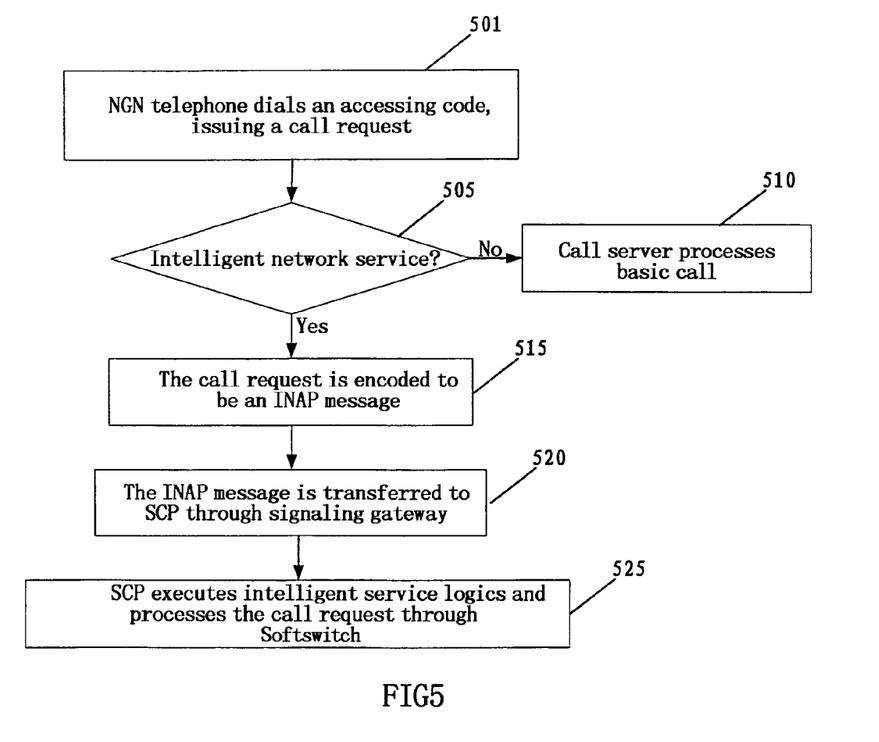
FIG. 5 is a flowchart showing a telephone in a NGN network accessing intelligent services in a PSTN network according to an embodiment of the present invention.

Furthermore, the present invention provides a method for a telephone in a next generation network to access into an intelligent network service in a PSTN network. FIG. 5 is a flowchart showing a telephone in a NGN network accessing intelligent services in a PSTN network according to an embodiment of the present invention.

As shown in FIG. 5, first at Step 501, a NGN telephone, such as the telephone 127A, dials an accessing code and issues a call request. The request is transmitted to the Softswitch 201. Then, at Step 505, the Softswitch 201 analyzes the call request, determines whether the call is a call for an intelligent network service; if not, the call server 320 of the Softswitch 201 process the basic call at Step 510, otherwise, at Step 515, the INAP (CAP, MAP) adapter 340 of the Softswitch 201 produces an INAP message. The produced INAP message is sent to the signaling gateway SG121 with a SIGTRAN protocol format, and forwarded to the SCP 110 in the PSTN network 100 by the SG 121. Finally, at Step 525, the SCP 110 executes the intelligent network's service logics and processes the call request through interaction of the signaling gateway SG 121, the media gateway TG 122 and the Softswitch 201 with the telephone 127A.

Alternately, according to another embodiment of the present invention, when the Softswitch 201 determines that the call request is an request for an intelligent network service provided by the SCP 110 of the PSTN network, the Softswitch 201 does not produce an INAP message, instead, the call request is outbound for the PSTN network 100 through the signaling gateway SG 121 and the media gateway TG 122, and encoded/decoded by a SSN (not shown) in the PSTN network.

Though the present invention has been described in details with some exemplary embodiments of the invention, these embodiments are not exhaustive. Those skilled in the art may make various variations and modifications within the spirit and scope of the present invention. Therefore, the present invention is not limited to these embodiments, rather, the scope of the present invention is only defined by the appended claims.

The invention claimed is:

1. A Softswitch device for a Next Generation Network, characterized in that said Softswitch device implements an intelligent network service in the Next Generation Network, and said Softswitch device includes:
   a network adaptive device located at a bottom layer of the Softswitch device, the network adaptive device for supporting standard protocols in said Next Generation Network, implementing communication between the Softswitch device and other devices in said Next Generation Network, as well as receiving call requests and sending data from higher layers of the Softswitch device to the Next Generation Network with required format and address;
   a call server in a higher layer of the network adaptive device, the call server for determining whether the call received by said network adaptive device is a common call or a call of the intelligent network according to an accessing code of the call, and processing the common call, or when the call is determined as a call of the intelligent network, transmitting the call to an Intelligent Network Application Part (INAP), Customised Applications for Mobile network Enhanced Logic Application Part (CAP) or Mobile Application Part (MAP) adapter;
   a resource manager in a higher layer of the network adaptive device, the resource manager for managing intelligent peripherals, performing audio interaction with a user through the call server, and transmitting the user input data to the adapter; and
   the adapter in a higher layer of the call server and the resource manager, the adapter for responding to the call of the intelligent network and encoding or decoding an INAP message.

2. The Softswitch device according to claim 1, characterized in that said Softswitch device further includes:
   a signaling transmitting adapter for transferring signaling data through IP packets; and
   a media gateway control adapter for transmitting data between said Softswitch device and one or more media gateways in said network.

3. The Softswitch device according to claim 2, characterized in that the media gateway control adapter uses one or more of the following protocols: H.323, MGCP, H.248 and SIP.

4. The Softswitch device according to claim 1, characterized in that said network adaptive device includes: an INAP/TCP interface for directly transmitting an expanded INAP encoded message through TCP/IP protocol.

5. A system for implementing an intelligent network, the system including a Softswitch device, at least one Service Control Point (SCP), an IP network and intelligent peripherals, the Softswitch device including a network adaptive device, a call server, a resource manager and an Intelligent Network Application Part (INAP), Customised Applications for Mobile network Enhanced Logic Application Part (CAP) or Mobile Application Part (MAP) adapter, wherein
   the network adaptive device is located at a bottom layer of the Softswitch device, the network adaptive device is for supporting standard protocols in said Next Generation Network, implementing communication between the Softswitch device and other devices in said network, as well as receiving the call request and sending data from higher layers of the Softswitch device to the Next Generation Network with required format and address;
   the call server is in a higher layer of the network adaptive device, the call server is for determining whether a call received by said network adaptive device is a common call or a call of the intelligent network according to an accessing code of the call, and processing the common call, or when the call is determined as a call of the intelligent network, transmitting the call to the adapter;
   the resource manager is in a higher layer of the network adaptive device, the resource manager is for managing intelligent peripherals, performing audio interaction with a user through the call server, and transmitting the user input data to the adapter;
   the adapter is in a higher layer of the call server and the resource manager, the adapter is for responding to the call of the intelligent network and encoding or decoding the INAP message;
   the at least one SCP is for executing intelligent service logic and producing INAP messages;
   the IP network is for connecting said Softswitch device and the SCP; and
   the intelligent peripherals are for providing special resources required by the intelligent network services.

6. The system according to claim 5, characterized in that said system further includes:
   a signaling gateway, connecting to said IP network at its one side and to a Public Switched Telephone Network (PSTN) at another side, for transferring signaling data between said IP network and said PSTN;
   a media gateway, connecting to said IP network at its one side and to a PSTN at another side, for transferring media data between said IP network and said PSTN;
   said Softswitch device further including:
   a signaling transmitting adapter for transferring signaling data through IP packets; and
   a media gateway control adapter for transmitting data between said Softswitch device and one or more media gateways in said network.

7. A method for a PSTN telephone to access into an intelligent network service in a next generation network, wherein there is at least one SCP in said next generation network for executing the intelligent service logics, said method including:
   issuing a call request from said PSTN telephone through dialing an accessing code;
   a network adaptive device in a Softswitch device transforming said call request issued by said PSTN telephone into a protocol format suitable for the next generation network;
   a call server in the Softswitch device determining whether said call request is an intelligent network service provided by the SCP or not according to an accessing code of the call, and when the call is determined as a call of the intelligent network, transmitting the call to an Intelligent Network Application Part (INAP), Customised Applications for Mobile network Enhanced Logic Application Part (CAP) or Mobile Application Part (MAP) adapter;
   if said call request is an intelligent network service provided by the SCP, the adapter in the Softswitch device encoding said call request into an INAP message and transferring the message to said SCP;
   responding to said INAP message and processing said call request by said SCP; and
   a resource manager performing audio interaction with a user through the call server.

8. The method according to claim 7, characterized in that said step for transforming the call request includes: transforming the call request in SS7 signaling format into a format suitable for transmitting on the IP network.

9. The method according to claim 8, characterized in that said step for transforming the call request includes: transforming the call request in SS7 signaling format into the SIGTRAN protocol format or H.248 protocol format.

10. The method according to claim 7, characterized in that said step for determining includes: searching a database that stores the accessing codes of the intelligent network, determining whether the accessing code of the call request of said PSTN telephone is an accessing code of the intelligent network.

11. A method for a telephone in a next generation network to access into an intelligent network service in a PSTN network, wherein there is at least one SCP in said PSTN network for executing intelligent service logic, said method including:

issuing a call request from said telephone in said next generation network through dialing an accessing code;

a call server in a Softswitch device determining whether said call request is an intelligent network service provided by the SCP or not according to an accessing code of the call, when the call is determined as a call of the intelligent network, transmitting the call to an Intelligent Network Application Part (INAP), Customised Applications for Mobile network Enhanced Logic Application Part (CAP) or Mobile Application Part (MAP) adapter;

if said call request is an intelligent network service provided by the SCP, the adapter in the Softswitch device encoding said call request into an INAP message;

a network adaptive device in the Softswitch device transforming said INAP message into a format suitable for the PSTN network and transferring said INAP message to said SCP; and responding to said INAP message and processing said call request by said SCP; and a resource manager performing audio interaction with a user through the call server.

12. The method according to claim 11, characterized in that said step for determining includes: searching a database that stores the accessing codes of the intelligent network, determining whether the accessing code of the call request of said telephone is an accessing code of the intelligent network.

13. The method according to claim 11, characterized in that said step for transforming includes: transforming the INAP message data in IP network format into a format suitable for the PSTN network.

14. The method according to claim 11, characterized in that said step for transforming includes: transforming the INAP message data in the SIGTRAN protocol format or H.248 protocol format into the SS7 signaling format.

15. A method for a telephone in a next generation network to access into an intelligent network service in a PSTN network, wherein there is at least one SCP in said PSTN network for executing intelligent service logic, said method including:

issuing a call request from said telephone in the next generation network through dialing an accessing code;

a network adaptive device in a Softswitch device transforming said call request into a format suitable for the PSTN network and transferring it to the PSTN network;

a call server in the Softswitch device determining whether said call request is an intelligent network service provided by said SCP or not according to an accessing code of the call, when the call is determined as a call of the intelligent network, transmitting the call to an Intelligent Network Application Part (INAP), Customised Applications for Mobile network Enhanced Logic Application Part (CAP) or Mobile Application Part (MAP) adapter;

if said call request is an intelligent network service provided by the SCP, the adapter in the Softswitch device encoding said call request into an INAP message and transferring said INAP message to said SCP;

responding said INAP message and processing said call request by said SCP; and a resource manager performing audio interaction with a user through the call server.

16. The method according to claim 15, characterized in that said step for determining includes: searching a database that stores the accessing codes of the intelligent network, determining whether the accessing code of the call request of said telephone is an accessing code of the intelligent network.

17. The method according to claim 15, characterized in that said step for transforming includes: transforming the call request in IP network format into a format suitable for the PSTN network.

18. The method according to claim 17, characterized in that said step for transforming includes: transforming the call request in the SIGTRAN protocol format or H.248 protocol format into the SS7 signaling format.

* * * * *